US009555286B2

(12) United States Patent
Martikka et al.

(10) Patent No.: US 9,555,286 B2
(45) Date of Patent: Jan. 31, 2017

(54) ARRANGEMENT, A COMMUNICATION MODULE, A SENSOR UNIT AND A METHOD FOR MONITORING PHYSICAL PERFORMANCE

(71) Applicant: Suunto Oy, Vantaa (FI)

(72) Inventors: Mikko Martikka, Vantaa (FI); Kimmo Pernu, Vantaa (FI); Erik Lindman, Vantaa (FI)

(73) Assignee: Suunto Oy, Vantaa (FI)

( * ) Notice: Subject to any disclaimer, the term of this patent is extended or adjusted under 35 U.S.C. 154(b) by 4 days.

(21) Appl. No.: 14/587,076

(22) Filed: Dec. 31, 2014

(65) Prior Publication Data

US 2015/0182795 A1  Jul. 2, 2015

(51) Int. Cl.
*H04Q 9/00* (2006.01)
*A63B 24/00* (2006.01)

(52) U.S. Cl.
CPC ............ *A63B 24/0062* (2013.01); *H04Q 9/00* (2013.01); *H04Q 2209/40* (2013.01); *H04Q 2209/43* (2013.01)

(58) Field of Classification Search
CPC ... A61B 5/0002; A61B 5/0024; A61B 5/0205; A61B 5/02055; G08B 25/10; A63B 24/0062
USPC ..................................................... 340/870.07
See application file for complete search history.

(56) References Cited

U.S. PATENT DOCUMENTS

| | | | |
|---|---|---|---|
| 4,583,547 A | 4/1986 | Granek et al. | |
| 6,494,410 B2 | 12/2002 | Lenz | |
| 6,897,788 B2* | 5/2005 | Khair ................... | A61B 5/0006 128/903 |
| 7,698,101 B2 | 4/2010 | Alten et al. | |
| 8,253,586 B1 | 8/2012 | Matak | |
| 2001/0034475 A1 | 10/2001 | Flach | |
| 2004/0170154 A1 | 9/2004 | Carter | |
| 2007/0152812 A1* | 7/2007 | Wong ................... | A61B 5/0002 340/539.12 |

(Continued)

FOREIGN PATENT DOCUMENTS

| | | |
|---|---|---|
| EP | 1531726 B1 | 6/2003 |
| WO | WO 9014792 A1 | 12/1990 |

(Continued)

*Primary Examiner* — Don N Vo
(74) *Attorney, Agent, or Firm* — Seppo Laine Oy

(57) ABSTRACT

An arrangement, a communication module, a sensor unit and a method for monitoring physical performance includes at least one communication module having means for providing an output DC power by wire, and means for receiving at least one sensor signal representative of measured physiologic activity from at least one sensor unit. Said at least one sensor unit adapted to measure physiologic activity and to generate analog measurement signals in response thereof and is connected to said DC power wire and having means for processing and sending a sensor signal representative of measured physiologic activity by a wire to said communication module. A processing unit is adapted to form from said analog measurement signals data messages in predetermined transmission time slots. A wireless communication unit is used for transmitting the data messages at successive time slots using a wireless communication protocol to a wireless receiver device.

20 Claims, 8 Drawing Sheets

(56) References Cited

U.S. PATENT DOCUMENTS

| | | | |
|---|---|---|---|
| 2007/0299323 A1* | 12/2007 | Arns | A61B 5/0059 600/301 |
| 2008/0164979 A1* | 7/2008 | Otto | A61B 5/0002 340/286.01 |
| 2008/0319330 A1 | 12/2008 | Juntunen | |
| 2011/0077473 A1 | 3/2011 | Lisogurski | |
| 2011/0082711 A1 | 4/2011 | Poeze et al. | |
| 2012/0022348 A1 | 1/2012 | Droitcour et al. | |
| 2013/0096704 A1 | 4/2013 | Case | |
| 2015/0265903 A1* | 9/2015 | Kolen | G06Q 30/00 700/91 |

FOREIGN PATENT DOCUMENTS

| | | |
|---|---|---|
| WO | WO2010141838 A1 | 12/2010 |
| WO | WO 2012112934 A2 | 8/2012 |
| WO | WO 2012135325 A2 | 10/2012 |

* cited by examiner

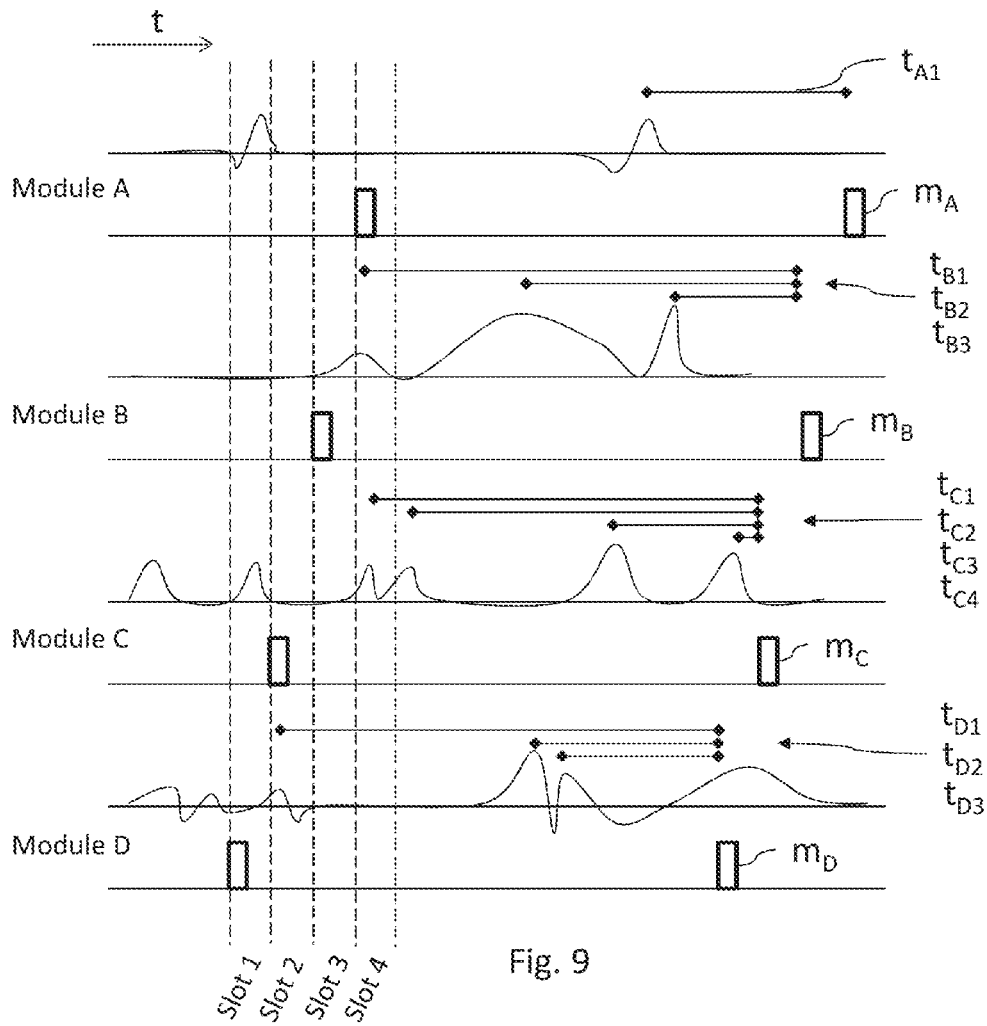

ARRANGEMENT, A COMMUNICATION MODULE, A SENSOR UNIT AND A METHOD FOR MONITORING PHYSICAL PERFORMANCE

FIELD OF THE INVENTION

The invention relates to communication arrangements used in personal performance monitoring for example during sports acts. In particular, the invention relates to a novel type of arranging the signaling for sensor signals and sensor units and a method, to be applied e.g. in wearable outfits for EMG electrodes applied against the body of a user.

BACKGROUND OF THE INVENTION

It is well known to measure electromyographic (EMG) signals from different parts of a human body during sports performances, the most common example being hear beat measurement using a surface EMG sensor-containing heart beat belt with a wireless transmitter module for communicating with a monitoring device, such as a sports watch. Measurement of surface EMG signals also from other parts of the body to monitor muscle activity in legs, arms, middle body or torso, for example. Such measurements can be carried using EMG sensors for example integrated into sports garment. It is also known to integrate signal transmitter modules into the belt or garment or to provide the module as a snap-on module to an assembly zone on the garment or belt. The module can be removed for washing the garment, for example. One disadvantage in known systems is that, although the transmitter can be removable and re-connectable, each sensor or sensor group requires a specifically designed transmitter module in order to operate properly.

To mention some specific examples, U.S. Pat. No. 8,253,586 discloses a performance measuring system comprising an article of clothing with an integrated measuring sensor and additionally a communication module, power module and computing module attachable to the article of clothing. The modules can be removed from one article of clothing and used in another article of clothing, while the sensor remains in the article. EP 1531726 discloses the use of a multitude of surface EMG electrodes to gain information simultaneously from muscles in various parts of the body. Also U.S. Pat. No. 4,583,547 relates to a similar application and in particular how conductive paths in garment can be arranged to provide a sensor signal form the measurement point to the signal transmitter module.

U.S. Pat. No. 7,698,101 discloses a system for pairing sensor-containing shoes with measurement electronics, including authentication of the shoes for the electronics. These solutions require dedicated transmitter module sensor pairs in order to be able to transmit the measurement signal to a monitoring unit.

Document WO-A-90/14792 discloses a biofeedback device for monitoring muscular activity in a sports skill movement which includes a band for securement around a muscle and carries a pair of spaced electrodes for receipt of electrical voltage from the muscle surface. The electrodes are connected to a differential amplifier and means for reporting the amplified voltage to indicate muscle tension over a continuum of the movement.

US 2013/0096704 discuss articles of clothing and module capable of sensing physical and/or physiological characteristics associated with the use of the clothing. The module contains an integral sensor. The system can activate module upon engaging the module to the clothing and confirm that the clothing and the module are authorized for use with one another and/or for automatic algorithm selection. The flexibility of the system is, however, restricted to adaptation of the sensor module to use its built-in sensor in different ways depending on the clothing it is attached to. Thus, a plurality of modules is needed if different types of sensors are used.

US 2008/0319330 disclose as a further example of currently available techniques a mobile transmitter for observing performance-related events and transmitting data on the observed events to a receiver. The transmitter comprises a timer for providing time references relating to the events and a memory for recording time references. The transmitter obtains a time reference from the timer and records the obtained time reference in the memory and is adapted to produce data messages containing a predetermined number of time references obtained from the memory and further to transmit the produced data messages to the receiver. The disclosed system allows for time stamping of events, such as heartbeats, and calculating the frequency and/or interval variation parameters of heartbeats. The system does not allow for synchronizing events from different detector sources.

One problem also touched by the above mentioned publications in a multi-sensor system is the communication of the different EMG measurement signals to a single monitoring device. There are systems, which utilize wired communication channels from a plurality of sensors to a single module. Such systems become impractical if there is a need to use many sensors at distant body parts and potentially separate belt or garment units.

Related prior art does not show any means how to minimize wiring in order between sensors and monitoring devices in applied health science. To provide a power signal to components like EMG sensors both power and EMG signal wires are used. Wireless approaches are envisaged e.g. in the aforementioned U.S. Pat. No. 7,698,101. However, to make each sensor an complex circuit with an integrated active RFID component, would be impractical both in medical applications where electrodes are usually disposable and wireless connections are often not allowed, and in sporting goods where electrodes need to be very thin, light and thoroughly washable.

A further aspect of the same problem in existing systems is how to handle signals from a plurality of sensor sources such that an overall analysis of the performance would be possible. The more sensors, the more wiring is needed in the garment or clothing. As such, a monitoring unit can relatively easily collect data from several sources, but may still lack information on the relationship between the data and the performance.

Thus, there exists a need for improved solutions for facilitating communication between a plurality of sensors and a central monitoring unit in sports and health monitoring devices, to allow for better analysis of the performance of an athlete or a patient.

The underlying idea of the invention is to take advantage of superimposed measurement signaling on a continuous DC power signal. The signal may be in analogous or in digital form or both. The invention is in other words based on messaging sensor-derived data from a plurality of sensors to communication modules, which are capable of receiving information from the sensors with a minimum of wiring, and on the identification of the sensors. It is known to superimpose or multiplex digital signals onto the same wire or set of wires as DC or analog signals. In heavy process industry, a system based on the Bell 202 standard is known as the HART protocol, which is also a standard (IEC 61158). It is a master/slave protocol, meanings that a slave device only speaks when spoken to by a master. The protocol implements the Open System Interconnection (OSI) 7-layer protocol model using frequency shift keying (FSK) to communicate at 1200 bps with a signal having bit values of 0 and 1 at 2200 and 1200 Hz, respectively. This signal is superimposed at a low level on the 4-to-20 mA analog measurement signal. Such signals may contain data such as device data, requests for device data, configuration data, alarm and event data, etc.

Another example is presented in the Digital Command Control (DCC) protocol of German origin that has been adapted, developed and standardized by the National Model Railroad Association (NMRA). It provides for individually command of several trains running on a track having a single power feed by modulating the DC voltage on the track to encode digital messages while providing electric power, thus providing independent identification and control of locomotives without special wiring requirements. The DCC technology has been further developed e.g. in U.S. Pat. No. 6,494,410, where a train after having received a DCC control information specifically addressed to it, applies a return signal with a higher frequency to the track, and which is detected by synchronizing its detection with the original DCC square wave voltage so that the return signal is detected in periods where the DCC signal is free of signal edges.

SUMMARY OF THE INVENTION

It is an aim of the invention to solve at least some of the above mentioned problems and to provide an arrangement which allows for signaling performance-related data from a plurality of sensors to a monitoring unit with a minimum of wiring between the various components of the system, and for identification of each sensor and for tracking the sensor signals especially when using a plurality of sensors, in order to set up meaningful sequences of sensor signals capable of describing actual muscle movements on a timeline.

It is an object of the invention to provide a related communication module and a sensor unit. A further object is to provide a method of monitoring a physical performance of a person.

The inventive concept is specific both in the sense of the field of technology it is used, and in the sense of delivering a DC power signal to a sensor, and in receiving an analog or digital measuring signal from the sensor on the same line. In one embodiment, the analog or digital measuring signal may be preceded by an unique identification code provided by the sensor.

This enables, by using a time slot based protocol, to identify the sensor and thereby greatly enhance the analyzing capabilities of the communication module and a monitoring unit.

The invention provides an arrangement for monitoring physical performance, including:
  at least one communication module having means for providing an output DC power by wire, and means for receiving at least one sensor signal representative of measured physiologic activity from at least one sensor unit;
  at least one sensor unit adapted to measure physiologic activity and to generate analog measurement signals in response thereof, the sensor unit being connected to said DC power wire, and having means for processing and sending a sensor signal representative of measured physiologic activity by a wire to said communication module;
  a processing unit adapted to form from said analog measurement signals data messages in predetermined transmission time slots;
  a wireless communication unit for transmitting said data messages using a wireless communication protocol; and
  a wireless receiver device adapted to receive said data messages at successive time slots.

According to preferred embodiments, the communication module comprises means for receiving and processing analog signals consisting of e.g. electromyographic (EMG) signals from EMG electrodes. The sensor units may be adapted to add a digital sensor unit identification code to an analog measurement signal. Also heartbeat (ECG) signals may be processed in a similar way. EMG signals can be used to monitor the activity of different parts of the body during a performance, and the present invention allows for monitoring also the synchronization and coordination between different muscle groups, for example, in the performance.

The sensor unit may be adapted to add a digital unit identification code, as discussed above in connection with the HART or DCC protocols, to the measurement signal sent on the wire, either on the DC power wire or on a dedicated signal wire. The advantage of using the DC wire is the reduced wiring needed e.g. in sports garments. Only two wires, plus and minus, need to be manufactured in the clothing between the sensor units and the communication module. If a common ground can be established between sensor units and the communication module, only one (plus) direct wire is needed to connect the sensor unit with the communication module.

Alternatively, in case of all-digital signaling between the sensor unit and the communication module, where a processing unit typically resides in the sensor unit, the identification of digital measurement signals may be based on time slot allocated to them as determined by a communication protocol, where the processing unit is further adapted to execute a sensor signal analysis algorithm specific to the type of sensor unit and/or the physiologic activity being measured, so as to determine first time points based on a predefined characteristics of the sensor signals. Second time points are determined that correspond to the timing of the predetermined transmission time slots according to the wireless communication protocol. The first and a second time point are paired for each data message to be sent to said wireless communication unit and information on the difference between the first and second time points is added to the data messages for the transfer of them to the wireless communication unit.

An inventive communication module for monitoring physical performance includes:
  means for providing DC power by wire to at least one sensor unit;
  means for receiving at least one sensor signal representative of measured physiologic activity from at least one sensor unit by a wire;
  means for allocating measurement data signals into data messages in predetermined transmission time slots;
  a wireless communication unit for transmitting said data messages to a wireless receiver device at successive time slots using a wireless communication protocol.

The processing unit, if residing in the communication module, is preferably adapted to:

receive analog measurement signals sent from a sensor unit on said wire;

identify said analog measurement signals based on a digital sensor unit identification code added to said measurement signal on the wire;

process said measurement signals into data messages allocated to predetermined transmission time slots;

transmit said data messages to a wireless receiver device at successive time slots using said wireless communication protocol The processing unit may according to one embodiment be adapted to detect the digital sensor unit identification code by using a lookup algorithm coded in a memory unit of the processing unit or communications module, and to combine data derived from the measurement signals with data relating to the identified digital code into said data messages to be sent by the wireless communication unit. The sending will take place at predetermined and successive time slots according to the wireless communication protocol and will thus reach the wireless receiver device in a fashion making it possible for dedicated software in said receiver device or in other external devices, to interpret, analyze and display meaningful exercise data to the user.

Alternatively, the communication module may act as more as a signal routing device, having distributed processing units in the sensor units instead, and is thus adapted to:

receive data messages in predetermined transmission time slots sent from a sensor unit on said wire;

identify each digital measurement signal based on the time slot as determined by a communication protocol;

transmit said data messages to a wireless receiver device at successive time slots using a wireless communication protocol.

The communication protocol mentioned herein is preferably at least similar to the protocol that is used between the wireless communication module and the wireless receiver device, only the transfer medium is here copper rather than air, but the protocol may of course also be a different one. Independently of the location of the processing unit, it is preferably further adapted to:

execute a sensor signal analysis algorithm specific to the type of sensor unit and/or the physiologic activity being measured so as to determine first time points based on predefined characteristics of the sensor signals;

determine second time points corresponding to the timing of said predetermined transmission time slots according to a communication protocol for the transfer of data messages to said wireless communication unit;

pair a first and a second time point for each data message to be sent to said wireless communication unit; and add information on the difference between said first and second time points to said data messages.

The communication module and the sensor unit may have mounting means fitting to a mounting zone on a sports item. These may consist of electromechanical fasteners, such as two snap buttons, for making electronic contact with the sports item while being mounted. The processing unit may be functionally connected to the contact terminals and to the wireless communication unit and capable of processing data received through the contact terminals and/or the wireless communication unit according to data processing instructions. In addition, the communication module or the sensor unit may have means for reading an identifier from the sports item while being mounted thereon, whereby the processing unit is capable of changing said data processing instructions based on the value of the identifier read from the sports item. This embodiment allows for the module to flexibly adapt its internal operation according to the environment (sports item or sensor) it is attached to. The data processing instructions changed comprise e.g. instructions for a sensor signal analysis algorithm. Thus, by simply mounting the module to different places, its operation can be affected to be optimal for the signal input to the module. The communication module or the sensor unit may include a memory for storing a set of data processing instructions corresponding to different identifiers and the processing unit is capable of choosing the data processing instructions from said set of data processing instructions based on the value of the identifier read. The processing unit may be capable of sending a request for data processing instructions corresponding to the value of the identifier read and receiving said data processing instructions through said wireless communication unit to/from the wireless device and optionally storing the received data processing instructions in the set of data processing instructions in said memory.

The communication module is in its various embodiments adapted to receive and process electromyographic (EMG) signals from one or more sensor units each connected to one or more EMG electrodes, and/or to detect a digital identification code representative of the sensor using a lookup algorithm coded in a memory unit of the processing unit. The identified digital code and the related measuring data may then be included in a data message to said wireless receiver device. The receiver device may be in communication with a plurality of communication units in one or more sports items with integrated sensors and mounting zones. All communication modules provide sensor signals to the receiver devices for further processing.

In one embodiment, the means for receiving a sensor signal representative of measured physiologic activity is using said DC power wire as a signaling channel. Alternatively, a dedicated signal wire may be employed. Further variations include a memory unit for storing an identifier of the communication module which is adapted to include said identifier in the data messages to a wireless receiver device. The communication module may also be capable of receiving data messages from another communication module and to interleave and relay received data messages received therefrom with its own data messages according to said to wireless communication protocol.

The processing unit, which may reside either in a communication module or in a sensor unit, is according to one preferred embodiment adapted to:

execute a sensor signal analysis algorithm specific to the type of sensor unit and/or the physiologic activity being measured, so as to determine first time points based on a predefined characteristics of the sensor signals;

determine second time points corresponding to the timing of said predetermined transmission time slots according to said wireless communication protocol for the transfer of data messages to said wireless communication unit;

pair a first and a second time point for each data message to be sent to said wireless communication unit; and add information on the difference between said first and second time points to said data messages.

A sensor unit includes according to the present invention an input for a DC power wire from the communication module, means for measuring physiologic activity and to generate analog measurement signals in response thereof; means for providing a sensor unit identification; means for processing and combining said measurement signals with said sensor unit identification into an output signal to be sent to the communication module on a wire; and means for sending said output signal representative of the measured physiologic activity to said communication module.

If the sensor unit includes a processing unit, the processing unit is further adapted to execute a sensor signal analysis algorithm specific to the type of sensor unit and/or the physiologic activity being measured so as to determine first time points based on predefined characteristics of the sensor signals, to determine second time points corresponding to the timing of said predetermined transmission time slots according to a communication protocol for the transfer of data messages to said wireless communication unit, to pair a first and a second time point for each data message to be sent to said wireless communication unit; and to add information on the difference between said first and second time points to said data messages to be sent to the communication module. The sensor unit may have specific data processing instructions for selecting a sensor signal analysis algorithm specific to the type of sports item and/or the physiologic activity being measured.

The sensor unit identification may be provided by adding a digital code unique to each sensor unit to the measurement signal, or by a communication protocol allocating predetermined time slots in which the output signals are sent to the communication module, or both.

The sensor unit may send the output signal representative of measured physiologic activity by using said DC power wire as a signaling channel, or a dedicated wire. The sensor unit is advantageously adapted to measure and process electromyographic (EMG) signals from at least one EMG electrode.

An inventive method of analyzing a physical performance of a person includes the steps of:
  measuring physiologic activity of said person with at least one sensor unit being powered by a DC power wire from a communication module;
  receiving in said communication module over a wire a measurement signal representative of the measured physiologic activity from said least one sensor unit;
  identifying in the communication module the sensor unit from the signal received from said sensor unit;
  transmitting data messages containing data derived from said measurement signals using a wireless communication protocol to a wireless receiver device adapted to receive said data messages at successive time slots.

The processing may include arranging the data in a chronological order, i.e. order corresponding to real temporal occurring of the phenomena relating to the data, based on the time information. According to one embodiment, the wireless communication protocol is a regularly repeating transmission time slot based protocol. This means that each module may have a predefined time slot, i.e., time window, during which it is allowed to transmit data to the receiver. Other modules may have different time slots. In practice, this may be handled as in the following steps:
  determining the time differences between a received sensor signal and the time of transfer of a message corresponding to said signal,
  including information on the time difference to said formed data message,
  processing in said wireless receiver device the sensor signals using said information on the time differences.

According to one embodiment, an analog output sensor signal is sent from the sensor unit to the communication module, to which has been added a digital code unique to the sensor unit. Alternatively, a digital sensor output signal according to a communication protocol provides sensor unit identification by allocating predetermined time slots in which the measurement signals are sent to the communication module.

The sensor unit may send the output sensor signals representative of measured physiologic activity to the communication module by applying the sensor output signals on said DC power wire, or a dedicated signal wire.

According to one embodiment, the inventive method includes the further steps of:
  executing either in a sensor unit or a communications module a sensor signal analysis algorithm specific to the type of sensor unit and/or the physiologic activity being measured, so as to determine first time points based on a predefined characteristics of the sensor signals;
  determining second time points corresponding to the timing of said predetermined transmission time slots according to said wireless communication protocol for the transfer of data messages to said wireless communication unit;
  pairing a first and a second time point for each data message to be sent to said wireless communication unit; and
  adding information on the difference between said first and second time points to said data messages to be sent to the communication module or the wireless receiver, respectively.

The present method thus allows for determining the temporal order of measurable signals corresponding to physical events during a physical performance of a person. At least two different performance-related signals may be measured at different locations of the body or equipment of the person using at least two different sensors attached to a communication module. Messages corresponding to said signals may be transferred from the communication modules wirelessly to a central monitoring unit. It is then easy to determine time differences between the signals and said transferring of the messages and to include information on the time differences to said messages. The data in the messages is further processed in the central monitoring unit based on the information on the time differences so as to determine the temporal order of events measured.

The receiver is typically a master device, which assigns the slots to the modules when they are initially connected to the system such that all devices transmit at different times. The module may include an internal memory unit having an identifier of the communication module stored therein and the processing unit is adapted to include said identifier in at least part of said data messages. This way, the receiver can determine the origins of the messages coming from different modules. It should be noted that once the receiver and the modules are synchronized, the time slot used also indicates the module sufficiently.

The performance-related signals may be electromyographic (EMG) signals measured from a body part of the person, an electrocardiographic (ECG) signal or a limb muscle EMG signal. The performance-related signals may also be acceleration, orientation or position signals measured from a body part of the person or equipment or garment carried by the person.

More specifically, the invention is defined in the independent claims.

The invention has considerable advantages. First, the invention allows for minimizing the amount of wiring necessary between sensors and communication modules. Secondly, it facilitates identification of individual sensors, and if a sensor is integrated in a sports item, the sports item itself and the function of the sensor in that item. Thirdly and as a consequence, it allows for temporally relating the individual features of the measured signals to each other, irrespective of the messaging protocol used. Because each message may contain information on the delay from measurement to messaging, the recipient of the messages has enough information on the real chronological order of the events measured.

The invention suits for many kinds of sensor signals, including EMG signals, such as heart EMG (ECG) signals and other muscular EMG signals, and movement-induced signals, such as acceleration signals.

The proposed technique is very efficient to implement and increases the amount of computation in the modules only a little compared with a system without time information. The amount of additional data in the wireless messages can also be kept very low. A single training session typically produces a great amount of data messages which are processed in the receiver to get a "master file" which includes detailed temporal training data from a plurality of sources within the personal-area network of a person. The master file can be processed further in a computer, if desired. It is not necessary to save individual data messages once the relevant data has been extracted therefrom.

The dependent claims focus on selected embodiments of the invention.

DEFINITIONS

The term "sports item" covers various pieces of garment and other items used when performing sports. In particular, the term covers personal clothing and other wearable items, such as heart rate belts, and personal sports equipment in direct possession of the person performing the sport. The term also covers other sports items that are at least temporarily in the vicinity of the person during the performance, i.e., can join the personal-area network of a central unit (monitoring unit) of the person. An example of such item is a golf bag. Further examples are given in the detailed description. "Sports" should be taken broadly to cover all kinds of physical activities.

"Message" is a typically digital data structure which is capable of carrying encoded data can be wirelessly sent from a wireless communication module to a wireless receiver in which the data can be extracted. The messages may contain several data fields with a field identifier (tag) and field value. Of particular use within this invention are timing data fields with an indicator of a delay from signal time-to-messaging time and optional data fields with other information on the signal (e.g. signal amplitude).

"Processing a sensor signal" covers all actions made by the communication module on the sensor signal for forming a data message based on the signal. Examples of processing actions include identifying and extracting the returning sensor signal from an outgoing DC power signal, detecting a digital identification code representative of the sensor, A/D conversion, and digital signal analysis, such as feature detection.

"First time point" refers to a moment of time determined by the communication module by processing the sensor signal. Typically, the first time point is determined using digital signal analysis and a signal analysis algorithm designed for a particular sensor type.

"Second time point" refers to the moment of transmitting sensor data-containing messages from a communication module to a receiver. Since the duration of the message (and messaging time slot) is typically short compared with the messaging delay (time from first time point to second time point) and all modules use the same setting, it is not relevant whether the second time point is set to be at the beginning or end of the message or between these ends. Essential is, however, that each module knows beforehand the upcoming time of at least the next messaging time slot.

"Mounting zone" is zone on a sports item dedicated or at least suitable for a communication module according to the invention. A mounting zone comprises both physical and electronic connection means (e.g. miniature snap buttons) for the communication module to both remain attached to the sports item and to be able to electrically communicate with one or more sensors of the sports item.

"ID" or "identifier" is a piece of machine-readable data which indicates the sensor or the sports item where the sensor is integrated. Also the number and type(s) of sensor(s) and/or actuator(s) therein may be coded into the ID, for allowing a communication module attached to the mounting zone to utilize them. The ID can for example be a sequence of characters stored in a semiconductor memory unit.

"Processing instructions" means computer-readable code (typically arranged in a single data file) with data content, which can be interpreted by the communication module to change its operation to correspond with the requirements of a sports item with a specific ID. The instructions may have effect for example on sensor signal (input signal) processing characteristics, data interface specifications with a sensor, and/or wireless data communication characteristics with a monitor unit.

The processing instructions may comprise a set of configuration values (passive instructions), computer-executable code (active instructions), or both, in a suitable data structure, most commonly in one or more data file. Thus, the processing instructions are sensor or sports item-specific software configuration files or applications, which can be utilized or run by the operating system (firmware) of the module.

"Monitoring" means receiving information on the performance using one or more sensors in one or more sports items through one or more communication modules according to the invention. Monitoring is preferably carried out using a wearable monitoring unit, such as a wristop computer, but may be done also using any other computing device capable of communicating with the one or more communication modules.

Next, embodiments of the invention and advantages thereof are described in more detail with reference to the attached drawings.

BRIEF DESCRIPTION OF THE DRAWINGS

FIG. 9 shows a graph of an exemplary messaging scheme with the system of FIG. 4 according to one embodiment of the invention;

FIG. 10 shows a table depicting an exemplary master file created in a monitoring device receiving the messages shown in FIG. 9 from the communication modules of FIG. 4;

DETAILED DESCRIPTION OF EMBODIMENTS

Figure 1:
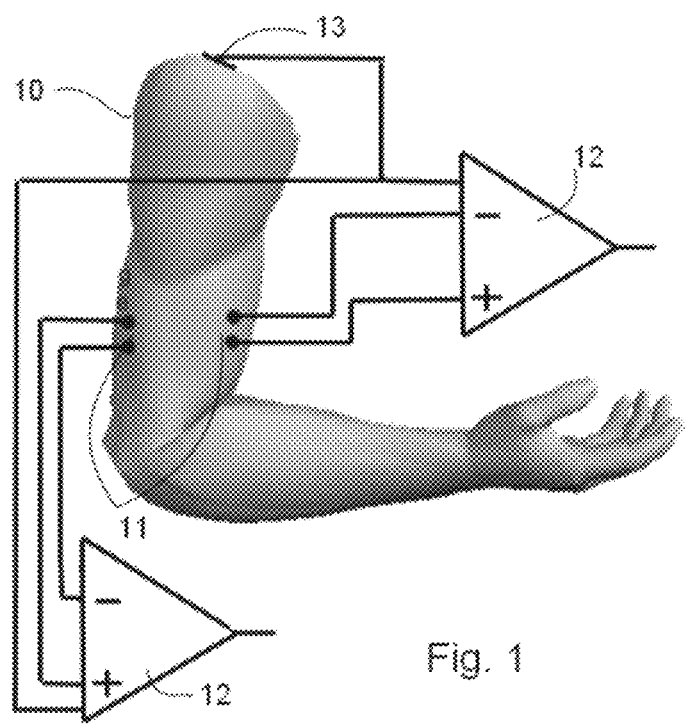
FIG. 1 shows the principle of how EMG detectors and sensors are attached to a human body.

In FIG. 1 is shown the general principle of how EMG electrodes 11 are attached to a human body 10. The electrodes are often placed in pairs on opposite sides of the body or body part, in order to measure the activity of both agonist and antagonist muscles, here the biceps and triceps muscles of the human arm. In especially important to monitor differences in actions of symmetric muscles on various sides of the body and limbs. Muscles of the weaker side may be developed in order to improve the sport performance or to return the normal efficiency after an injury. The trainee gets immediately response of the balance and the change in balance of actions of muscles, by means of which the trainee may control and improve the efficiency of the physical exercise and prevent the weakening of efficiency due to unilateral fatigue of muscles. Such information is measured, processed, analyzed and indicated by the inventive method and system.

The weak EMG signals in the microvolt range are amplified by amplifiers 12, and sent on for further processing. A reference electrode 13 placed on a relatively inactive part of the body with respect to the muscle activities to be measured is also shown.

Figure 2:
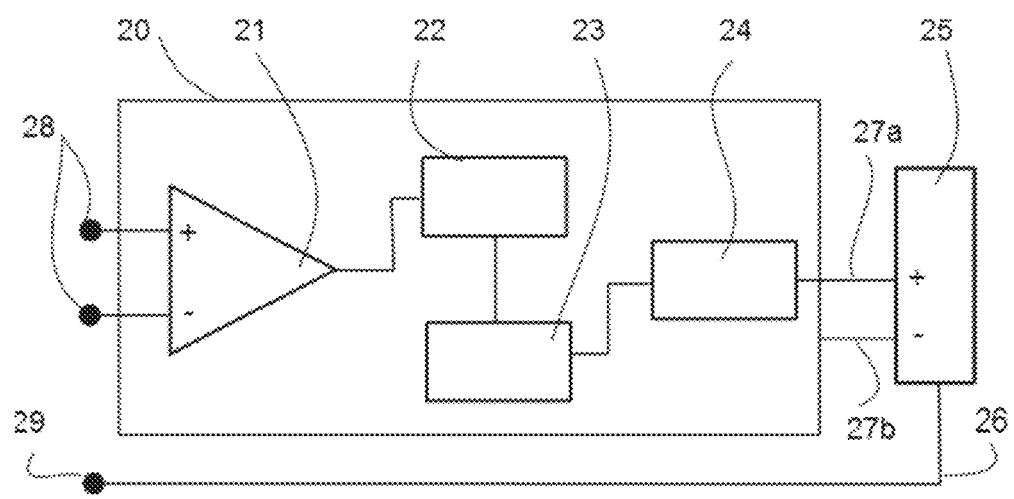
FIG. 2 shows schematically the circuitry involved in EMG signal detection according to the present invention.

FIG. 2 shows schematically the circuitry involved in EMG signal detection according to the present invention. There, an EMG sensor unit 20 consists of skin electrodes 28, an op-amplifier 21, high- and low-pass filters 22, 23 and an identification unit 24. The EMG sensor 20 is, according to the invention, connected to a communication module 25 only by means of DC power wires 27a and 27b. A reference electrode 29 is connected to the communication module unit by wire 26. The task of the identification unit 24 is to provide an identification code for the EMG sensor unit 20 to the communication module 25. In one embodiment, the identification unit 24 may consist of a DSP unit not only capable of sending an identification signal of the sensor unit 20, but also an A/D-converted digital measuring signal, thus representing a system where a processing unit reside in the sensor unit 20. The role of the communication module 25 may then merely be to effect the transformation of the sensor unit signals to a protocol suitable for transfer to the wireless receiver device.

Figure 3:
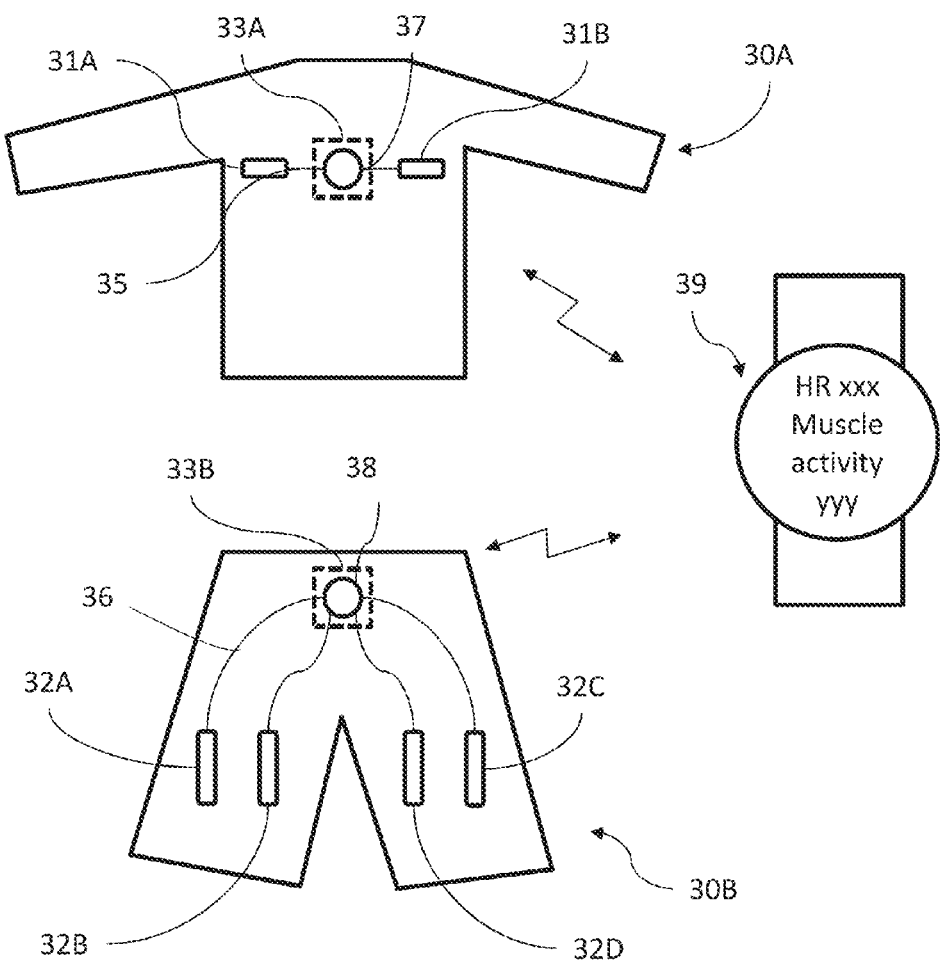
FIG. 3 illustrates a monitoring system according to one embodiment of the invention with communication modules attached to sports garments with integrated EMG sensors.

FIG. 3 shows one example of a system that can take advantage of the invention. The system comprises a first sports garment (shirt) 30A and a second sports garment (shorts) 30B, both containing integrated EMG sensors. The shirt 30A comprises first EMG sensor pads 31A, 31B positioned to measure heart EMG signal. In the shorts 30B, there are second EMG sensor pads 32A-D are positioned in two groups (32A and 32B/32C and 32D) against both thighs to measure thigh muscle EMG activity. The heart EMG pads 31A, 31B are connected to a first mounting zone 33A in the shirt 30A using first wirings 35A. Similarly, the thigh muscle activity EMG pads 32A-D of the shorts 30B are connected to a second mounting zone 33B in the shorts using second wirings 35B.

To the first and second mounting zones 33A, 33B, there are attached a first and a second communication module 37, 38, such that they are electrically connected to the first and second wirings 35, 36 and further to the first and second EMG sensor pads 31A-B, 32A-D, respectively.

Although discussed here as a modular system, i.e. with releasable and re-mountable communication modules, the communication modules may also be integral parts of the sports garments. The communication modules 37 and 38 are capable of detecting and processing EMG signals provided by the EMG pads 31A-B, 32A-D. The processing may comprise identifying and extracting the returning sensor signal from an outgoing DC power signal, detecting a digital identification code representative of the sensor amplification, A/D conversion and analysis steps. The analysis step may comprise signal characteristic point, such as peak point, detection according to a detection algorithm stored in the processing units of the communication modules. If a plurality of sensors are connected to a single unit, as in the case of shorts 30B (EMG from both legs measured separately), the analysis is carried out for both sensor signals separately. The data from each sensor may be sent as separate messages or integrated into a single message.

The communication modules 37, 38 are also configured to determine the time point of transmission of a message relating to the characteristics detected and to code the time difference between the time of detection and time of transmission (i.e. time stamps) into the message to be transmitted, along with desired data on the signal itself. In some applications, such as heartbeat detection, only the number of heartbeats is essential, whereby the message may contain only the time stamps of the heartbeats, or only the number of beats since last transmission. In other applications, such as muscular activity measurement by EMG, also other signal properties, such as the magnitude and/or duration of the EMG signals is of interest and is preferably coded in the messages with respective time stamps. If a plurality of sensors is connected to a single unit, their data and time stamps may be included in a single message, if desired.

There is also provided a monitoring unit (wristop computer) 39, to which the communication modules 37, 38 wirelessly transmit the messages formed in the abovementioned manner, i.e. the desired measurement information and time stamps received from the sensors after processing in the processing units of the communication modules 37 and 38. The monitoring unit 39 receive the messages and process their contents so as to determine the temporal order of the signals of from the different sensors.

According to one embodiment, both mounting zones 33A, 33B have identifiers readable by the communication modules, to be able to adapt the communication modules 37, 38 for these particular measurement environments. Thus, the modules may be identical in hardware and firmware but can change their internal operating instructions to co-operate in the best possible way with the sensor devices and/or monitoring unit they are connected to. Parameters that are potentially affected by the adaptation include e.g. amplification characteristics of the sensor signal, processing algorithms of the sensor signal and communication channel characteristics between the module with the monitoring unit.

The monitoring unit 39 may serve to provide the operating instructions for the modules 37, 38 based on the identifiers read by the modules. The request and transmitting the instructions are preferably done through wireless communication. Alternatively, the instructions corresponding to the identifiers may be stored in the modules 37, 38, whereby no communication with the monitoring unit 39 at the adaptation phase is needed.

To give an example of adaptation of the modules, the identifier of the shirt 30A can "tell" the module 37 that there is one sensor (two pads) of EMG type connected and that the signal amplification level required is X. The identifier of the shorts 30B can "tell" the module 38 that there are two sensors (four pads) both of EMG type connected and that signal amplification level required for both of these is Y. As indicated above, the "telling" may take place through internal-only adaptation (instructions pre-stored in the module) or through communication with another device, such as the monitoring unit, a computer or a cloud service.

Figure 4:
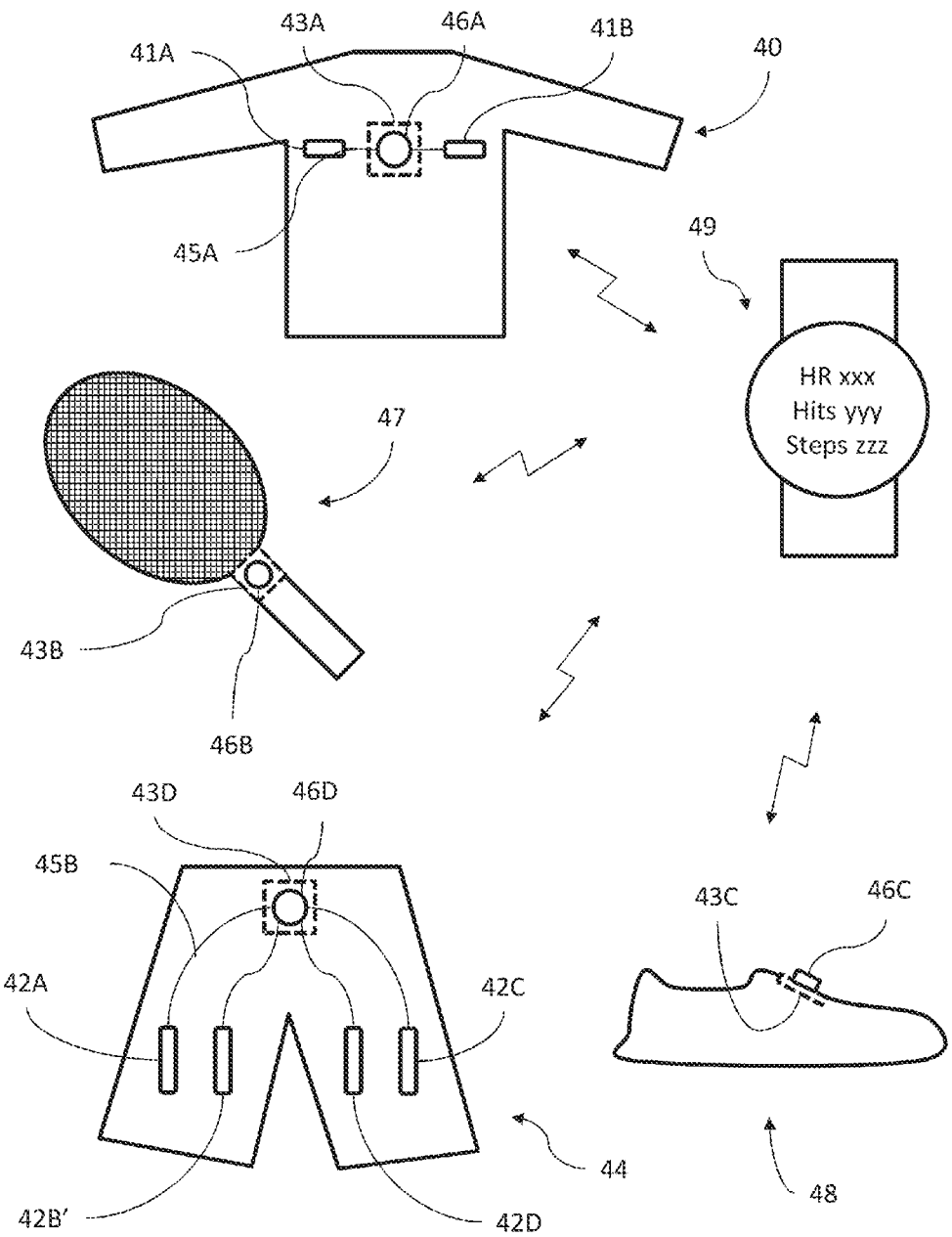
FIG. 4 shows another exemplary monitoring system with communication modules attached to two pieces of garments with an integrated EMG sensor, tennis racket and shoe.

FIG. 4 shows a modified exemplary system with sports garments 40 and 44 corresponding to the garments 30A and 30B of FIG. 3, respectively. The EMG pads are denoted with reference numerals 41A-B and 42A-D, the first mounting zone with 43A and 43D, wirings with 45A and 45B and the first communication module attached thereto with 46A and 46D. If desired, the mounting zones 43A, 43D may comprises a respective identifiers readable by the modules 46A, 46D. In addition, there is provided a tennis racket 47 with a second mounting zone 43B and a communication module 46B and a sports shoe 48 with a third mounting zone 43C and a further communication module 46C. The mounting zones 43B, 43C of the racket 47 and shoe 48 may be connected to acceleration sensors, orientation sensors or position sensors, to mention some examples, so as to be able to communicate corresponding acceleration, orientation or position information to the communication units 46B, 46C and further to the monitoring unit 49.

Similarly to the situation with EMG sensors, the communication modules 46B, 46C are also configured to processing the sensor signals, comprising e.g. sensor ID, amplification, A/D conversion and analysis steps. In this case too, the analysis step preferably comprises detection of characteristic points of the signal, such as peak points, using a detection algorithm stored in the processing units of the communication modules. In particular, the (absolute or relative) time of the characteristic point is recorded. In addition, the communication modules determine the time point of transmission of a message relating to the characteristics detected and code the time difference between the time of detection and time of transmission into the message to be transmitted, along with desired data on the signal itself. Thus, the chronological order of the EMG, acceleration, position and/or orientation signals can be determined by the monitoring unit receiving messages of the respective modules.

The mounting zones 43B, 43C also contain respective identifiers readable by the modules 46B, 46C to indicate what kind of operation of the communication modules 46B, 46C are required, as discussed above with reference to the system of FIG. 3 It is also possible that the racket 47 and/or shoe 48 are not provide with any sensors connected to the mounting zones 43B, 43C. In that case, their identifiers may "tell" the modules 46B, 46C that an internal sensor, such as an acceleration sensor, of the modules 46B, 46C are to be used. In this case, the identifiers can also be "void". In other words, if a module is not able to find any identifier with specific data content (identifier code), it assumes by default to operate in a particular way, typically using its internal sensor and corresponding pre-stored processing instructions for usage of the internal sensor.

The monitoring unit 49 is schematically depicted in the form of a wrist-worn computer. The monitoring unit comprises a processing unit and a communication unit (not shown) for communication with one or more modules of the kind described above. The communication unit utilizes a wireless communication protocol to communicate with the communication modules(s) it is intended to communicate with. The protocol is preferably a time slot-based protocol. Examples of suitable protocols include like Bluetooth LE and ANT+, using direct-sequence spread spectrum (DSSS) modulation techniques and an adaptive isochronous network configuration, respectively. A thorough description of the necessary hardware for various implementations is available e.g. from the Texas Instrument®'s handbook "Wireless Connectivity" which includes IC circuits and related hardware configurations for protocols working in sub-1- and 2.4-GHz frequency bands, such as ANT™, Bluetooth®, Bluetooth low energy, RFID/NFC, PurePath™ Wireless audio, ZigBee®, IEEE 802.15.4, ZigBee RF4CE, 6LoW-PAN, Wi-Fi®, GPS.

For example, in the case of Bluetooth LE, an Attribute Profile (ATT) wire application protocol is used. An attribute is composed of three elements:
a 16-bit handle;
an UUID which defines the attribute type;
a value of a certain length.

A handle is a number that uniquely identifies an attribute and is expected to be stable for each device. A UUID (universally unique identifier) is an identifier standard used in software construction to enable distributed systems to uniquely identify information without significant central coordination. The value is an array of bytes of any size. The meaning of the value depends on the UUID.

Also TDMA-based protocols may be used, as discussed in "TDMA Protocol Requirements for Wireless Sensor Networks", Sensor Technologies and Applications, SENSOR-COMM '08. Second International Conference on 25-31 Aug. 2008, Pages 30-35, ISBN: 978-0-7695-3330-8.

One task of a monitoring unit 49 is to collect messages sent by communication units in the same personal-area network and to display and/or store relevant information form the messages to the user via a display or to the memory unit for further use.

The sports items 30A, 30B, 40, 44, 47 and 48 are preferably passive, i.e., are not provided with own power sources. Instead of that, the power for both identifier-reading and sensor operations is obtained from power sources contained in the communication modules 37, 38, and 46A-46D. The present modules can be used in connection with any sports items within the personal-area network of a person. Examples are pieces of garment carried out by the person, such as shirts, trousers, socks, hats, caps, footwear, handwear and belts and various pieces of sports equipment necessary for any particular sports, including rackets, bats, clubs, sticks, skis, bicycles, balls, vehicles, and bags.

Examples of sensors contained in the modules include the EMG, acceleration, orientation, position sensors already mentioned above, and additionally, temperature and pressure sensors, such as air pressure sensors or tactile sensors, and photosensors. Specific sensor types for the above-mentioned purposes include conductive electronic potential sensors, micromechanical acceleration sensors, micromechanical gyroscopic sensors, micromechanical magnetic sensors, micromechanical pressure sensors, satellite positioning system sensors (e.g. GPS or GLONASS), resistive and capacitive touch sensors (with optional touch position and/or touch force detection capability) and digital imaging sensors (e.g. multi-pixel CCD or CMOS sensors).

Specific sports item examples include heartbeat ECG belts, muscular EMG belts or garments and tennis rackets, golf clubs and skiing equipment with acceleration sensors or orientation sensors.

Figure 5:
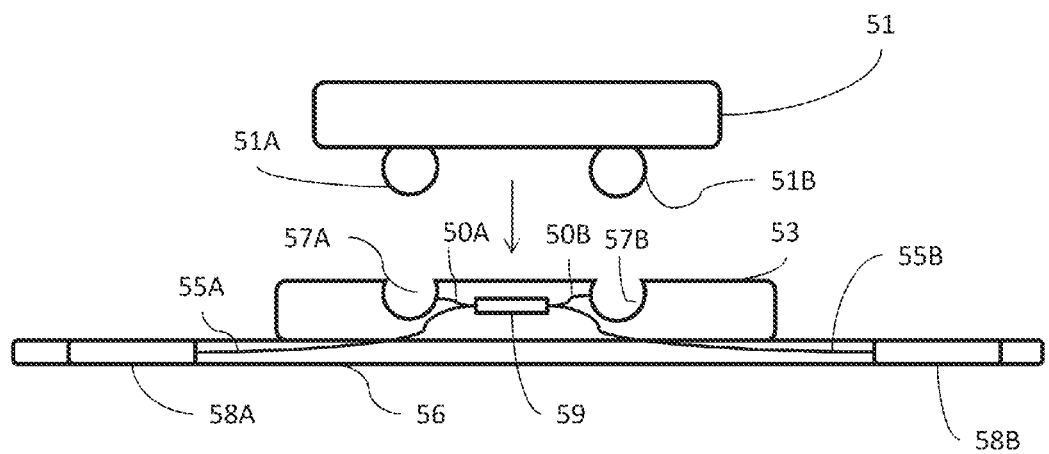
FIG. 5 shows a schematic side view of a communication module and mounting zone on a sports item.

FIG. 5 illustrates two key components of a modular system according to a preferred embodiment of the invention. These are the communication module 51 and sports item 56. The exemplary communication module 51 includes two electric contact terminals 51A, 51B on the outer surface of the module. In this example, the contact terminals 51A, 51B are in the form of studs capable of being snapped into suitable sockets 57A, 57B of a mounting zone 53 of a sports item 56 to provide both attachment and electric connection. There may also be provided separate or additional means to take care of these functions.

In the mounting zone 53, there is provided an identifier memory unit 59 electrically connected to the sockets 57A, 57B. Thus, when the module 51 is connected to the mounting zone 53, it is able to access the sensor unit 59 and deliver the DC power necessary to activate the sensor unit 59 into operation, and to receive the sensor unit ID sequence and the EMG signals over the same two wires. The EMG sensor pads 58A, 58B are connected to the sensor unit 59 using suitable wirings 55A, 55B in the sports item 56. The sensor unit 59 unit may be a similar circuit as item 20 in FIG. 2. The module may distinguish between identifier data and sensor input data by frequency or pulse characteristics of the signals.

The mounting means of the communication module and the mounting zone of the sports item are preferably designed to allow for repetitive mounting and removing of the communication module(s) thereto/therefrom. Thus, the module can be removed if a person wants to use the module in another sports item or for example during washing of the sports item or charging or changing of a battery of the module.

The inventive sensor unit may have a similar fastening arrangement to a sports item 56 as described above. If the sensor unit includes a processing unit, much of the function is similar to what have been described above. Obviously the garment contain in such a case no sensor module, but only sensor pads, EMG electrodes etc., and may also in both cases (communication module and sensor unit) contain small identifying tags circuits for conveying the information to the processing unit of what sport item is in question.

Figure 6:
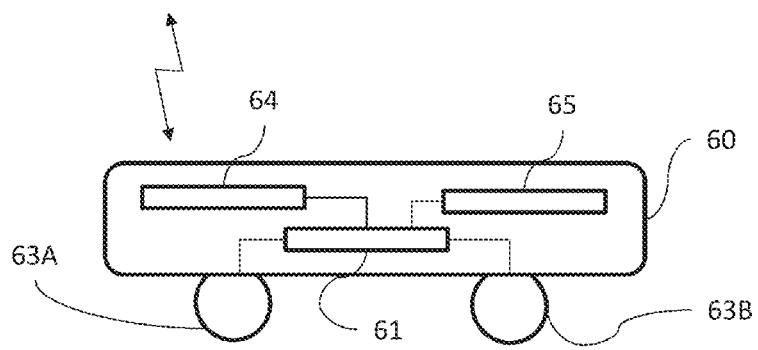
FIG. 6 shows a schematic block diagram of a communication module according to one embodiment of the invention.

FIG. 6 shows in more detail the main internal components of a communication module 60 according to one embodiment of the invention. The module 60 comprises a processing unit 61 which controls and processes the input and output of the module via a wireless communication unit 64 (to and from a monitoring unit) and the contact terminals 63A, 63B (towards an identifier and sensor in a sports item). There may be provided a separate input and/or output circuitry (not shown) between the processing unit 61 and the contact terminals 63A, 63B, comprising necessary circuits for sensor ID extraction if not done in the processing unit and, if needed, amplification of the input signals.

The processing unit 61 typically comprises a microcontroller operated by firmware, and an amount of memory. There may also be a separate memory circuit (not shown) for storage of larger amounts of data. Tasks of the processing unit 61 include performing internal data processing actions of the communication module 60 and controlling communication to/from the monitoring unit and the sports item the module is attached to. The data processing actions include in particular the sensor signal processing actions required for determining the sensor ID and the time stamps for the messages transmitted, as described above. Instructions for the data processing are potentially adaptively selected on the basis of the sensor ID read from the sports item, as described above.

The communication module 64 comprises an antenna and necessary electronics for amplification of the received and transmitted signals and for coupling with the processing unit 61. The communication unit 64 can utilize any desired wireless communication protocol, such as Bluetooth, ANT, WLAN and different versions thereof. The module is powered by a power source 65, most typically a battery. There may also be means for charging or allowing for changing the battery, like a DC power inlet (nor shown). Processing instructions are preferably stored in and/or provided to the communication module as stand-alone applications, which can be run by the operating system (firmware) of the module. This allows for very generic modules still suitable for a variety of uses to be manufactured. In the preferred embodiment shown, the number of electronic contact terminals in the sports item is two. The terminals are connected both to said memory unit and to the one or more sensors. The communication link through the connected terminals of the communication module and the sports item may be arranged such that signals from the memory unit and from the sensor(s) are distinguishable, e.g. by their frequency characteristics, so that both the memory unit and the sensor(s) are separately readable.

Figure 7:
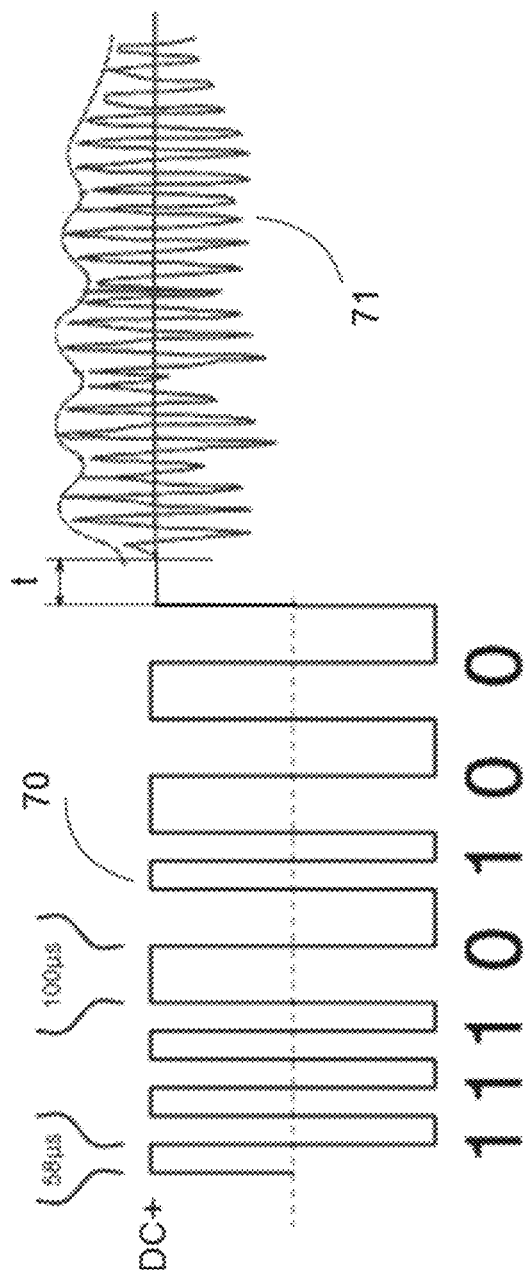
FIG. 7 shows an exemplary signaling protocol of the present invention.

FIG. 7 shows an exemplary signal protocol, including sensor identification, to be used between an EMG sensor unit and a communications module. When addressing the communications module to provide it with EMG data, the sensor unit (see item 24 in FIG. 2) alternates the direction of the DC voltage, resulting in a modulated pulse wave 70. The length of time the voltage is applied in each direction provides the method for encoding the identification of the sensor unit. A binary "1" is a pulse with the length of 58 µs for a half cycle, while a binary "0" is at least 100 µs for a half cycle. Each sensor unit is given a unique code and will thus be identified by the communications module 25 of FIG. 2. After the identification code has been sent, there is a time delay t reserved for the sensor unit to start to superimpose the measurement signal 71 on the DC power line to the communications module. Alternatively and as discussed in connection with FIG. 2, the measurement signals may be transmitted in digital form as a payload signal following the identification code.

Figure 8:
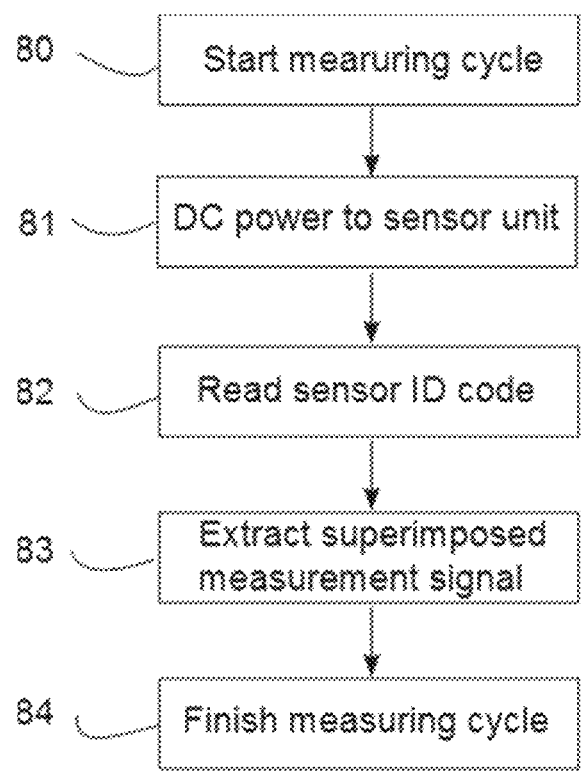
FIG. 8 shows a flow chart with an exemplary measuring cycle scheme of the present method.

FIG. 8 shows a flow chart of the present method according to one embodiment. First, according to a timing protocol running in the communication module itself or in a master monitoring unit, the communication module initiates a measuring cycle in step 80 with the purpose of receiving measurement data in a time slot over a wire from a specific sensor unit. The power feed to a sensor unit may be initiated in step 81. If the power feed is continuous, step 81 is bypassed. Next, the sensor ID code is read in step 82. In step 83, the communication module analyzes the sensor signal superimposed on the DC signal and extracts it. The extracted signal may be further processed in an intermediate step (not shown), and the measuring cycle is finished in step 84 when the data is transferred to the processing unit of the communications module in the time slot reserved for it.

FIG. 9 illustrates as a chart a further embodiment of the invention, where the arrangement with sensor measurement, signal processing and messaging scheme are as in the exemplary system of FIG. 4. The chart exhibits time t on the horizontal axis and sensor signals and module-to-monitoring unit messages for each of the modules A, B, C and D, corresponding to the modules 46A-46D of FIG. 4, respectively. Looking first on the messaging scheme, the exemplary protocol used for communication between the modules and the monitoring unit is a time slot-based protocol. This means that a separate time window (slot) for message transmission is assigned for each of the modules. The cycling of successive time windows is illustrated by Slots 1-4 in FIG. 9 (Module D has been assigned Slot 1 . . . . Module A has been assigned Slot 4). The monitoring unit listens over the Slots 1-4 to receive messages from each of the modules A-D. Once all slots have been gone through, the cycle repeats.

Looking next on the sensor signals and in particular the latter of the two messaging cycles shown in FIG. 9, each sensor provides a sensor signal depending on the type of sensor and activity to be measured. For example the sensor coupled to Module A is a heartbeat EMG sensor and therefore provides a relatively regular signal at every heartbeat, whereas the acceleration sensor in the racket with Module B provides an irregular signal according to the movement of the racket and so on. In this example, local highs (peaks) of the signals that take place after the last message transmission of the module concerned (i.e. all peaks that have not yet been reported to the monitoring unit) are determined and their time points recorded (cf. left ends of horizontal timelines $t_{XY}$, where X is a module identifier A, B, C, D and Y is a peak identifier 1, 2, 3, 4). In addition, the time points of next upcoming transmissions of messages $m_A$, $m_B$, $m_C$, $m_D$ are determined (cf. right ends of the horizontal timelines $t_{XY}$). The time $t_{XY}$ elapsed between these time points is coded in the corresponding messages $m_A$, $m_B$, $m_C$, $m_D$.

Based on the scheme illustrates in FIG. 9, a monitoring unit capturing all the messages $m_A$, $m_B$, $m_C$, $m_D$ transmitted by the modules A-D is able to arrange the peaks of the signals in chronological order, some of which are shown in the form of a table with exemplary arbitrary values in FIG. 10. The key to the capability of arranging the signals is the time information $t_{XY}$ determined by the sensor units or communication modules and contained in the messages $m_A$, $m_B$, $m_C$, $m_D$.

According to one embodiment, a communication module is capable of not only transmitting data messages, but also receiving data messages from another similar communication modules and relaying such received data messages forward. Preferably the messages are relayed at the time slot assigned for the relaying module. The relayed message can be included as part of the data message of the relaying module or simply transmitted one after another, having included the identifier of the original module to the relayed message, so that the receiver knows which module the data in the message relates to. As a consequence, it may be necessary to include in the relayed data both an identifier of the other similar data module and information on the duration from the time of receipt at the relaying module. The relay duration information is necessary for the receiver to maintain the chronology of the data, since a relayed message has spent more time in the system than a directly received message. These duration information can in practice be included in many ways to the data messages, including adding information on the time of receipt or duration of "stay" of the relayed data in the relaying module, and determining the total duration from origin of the original signal to the transmitting of the relayed message.

The signal processing scheme may also be different than illustrated above and different for each sensor type and/or measurement point and/or expected signal characteristics. For example, peak determination, zero point determination, starting or ending points of the signal, predefined threshold level crossing points of the signal, duration of the signal, integral of the signal over time, slope of the signal, frequency of the signal and so on may be used to identify the characteristics of a signal and accordingly process it, such as a heartbeat signal, limb muscle EMG signals, and acceleration signals from limbs and sports equipment. If the sensor is a digital imaging sensor, the point of interest is the moment of imaging, i.e. the formation of the photosignal at the imaging sensor.

An exemplary time slot mechanism for signaling from a sensor unit sending out sensor signals to a communications module is envisaged in the co-pending Finnish Patent Application 20135911 filed on Sep. 10, 2013. There, a data frame having a predetermined length is defined. The data frame is divided into time slots. The time slots are allocated in a predetermined manner for data packets containing control (header information, identification etc.) signaling, electrode (EMG pad) data information and broadcast (network re-configuration) signaling. In asynchronous and ad-hoc networks, a transmitted time frame usually controls the synchronization, as other components of the network listen and synchronize to it. Alternatively, a read request command triggered by the aforementioned wireless communication protocol is sent from the communications module to each of the sensor units, which then respond with a data frame. The data frames are then compiled in the communications module into data messages to be sent to the monitoring unit, as discussed above.

The duration of a data packet transmission in a time slot should be shorter than the time slot itself. Transmission starts at the beginning of a time slot and stops when the complete packet has been sent. The reception period should start slightly before (pre-listen time) the beginning of the time slot, to allow for some jitter between device time synchronization. Reception should stop when a complete payload packet has been received or at the latest when the time slot time is used up.

The time slot mechanism may also be synchronous, in which case a synchronization method is needed. Such a method is to schedule the transmissions of each sensor unit by their identification data packet, which includes bits that determine the transmission time for their data frames.

The time slot mechanism is as to its data configuration preferably at least similar to the data architecture of the communications protocol that is used between the wireless communication module and the wireless receiver device.

Figure 11:
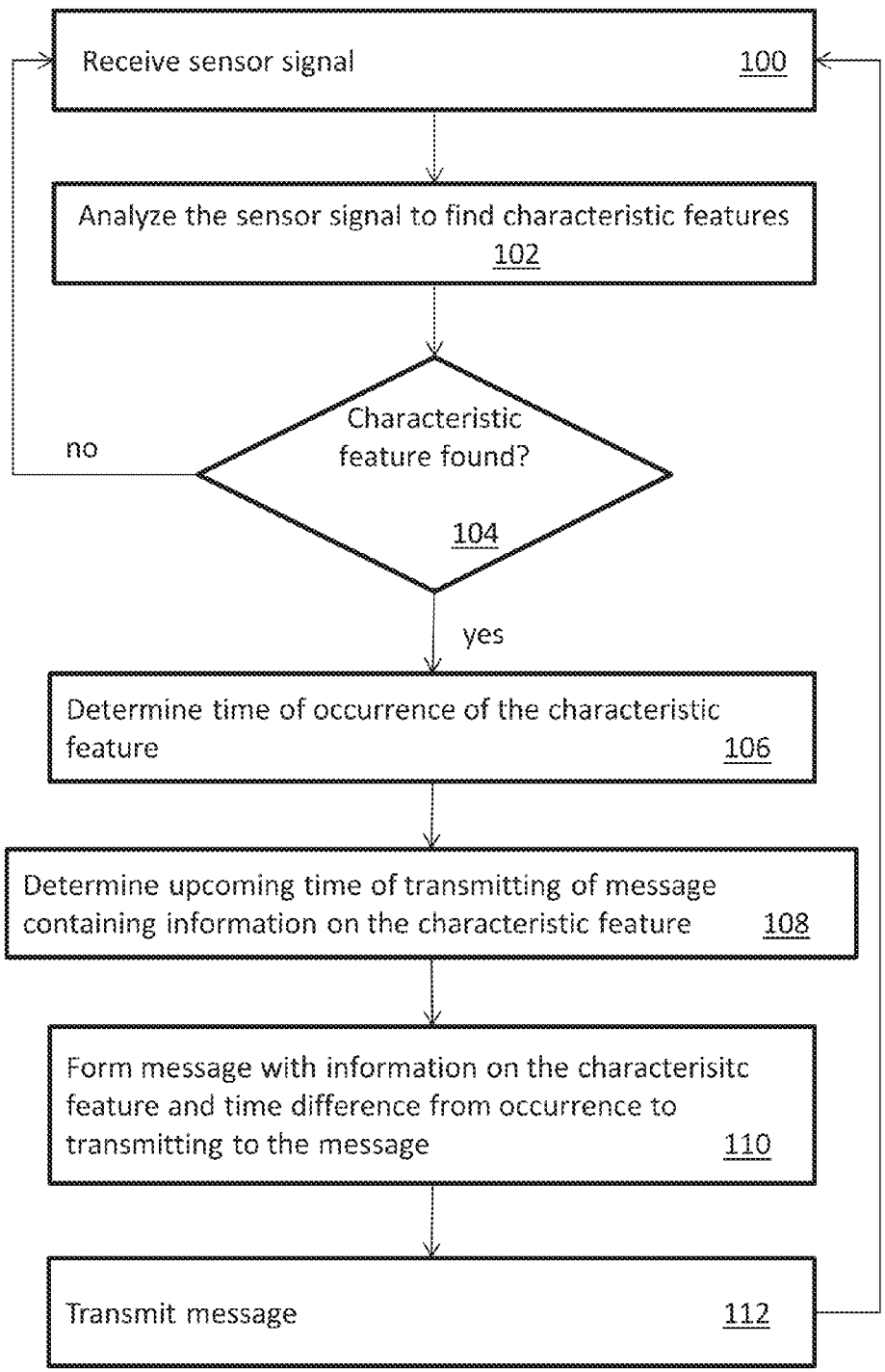
FIG. 11 shows an exemplary flow chart running in a communication module and using a messaging scheme like the one in FIG. 9.

FIG. 11 shows a flow chart of the present embodiment described above. First, in step 100, the communication module receives a sensor signal from a sensor. In step 102, the module analyzes the sensor signal in order to find a characteristic feature (e.g. peak of an EMG signal). Signal measurement and analysis process continues in the background all the time.

When the module finds a characteristic feature (step 104), it determines its time of occurrence in step 106. In a real-time process, the time of occurrence is the present time. Next, in step 108, the module determined the next time slot available for it to transmit data relating to that feature. In step 110, the module forms a message to be transmitted, including desired features of the signal and the time elapsed from signal to transmission. In step 112, the module transmits the message. The process is repeated for each relevant signal or feature found.

It is to be understood that the embodiments of the invention disclosed are not limited to the particular structures, process steps, or materials disclosed herein, but are extended to equivalents thereof as would be recognized by those ordinarily skilled in the relevant arts. It should also be understood that terminology employed herein is used for the purpose of describing particular embodiments only and is not intended to be limiting. Reference throughout this specification to "one embodiment" or "an embodiment" means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment.

As used herein, a plurality of items, sport goods, signaling protocols etc. may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as de facto equivalents of one another, but are to be considered as separate and autonomous representations of the present invention.

Furthermore, the described features, structures, or characteristics may be combined in any suitable manner in one or more embodiments. In the following description, numerous specific details are provided, such as examples of lengths, widths, shapes, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

The invention claimed is:

1. An arrangement for monitoring physical performance, including:
    at least one communication module having means for providing an output DC power by wire, and means for receiving at least one sensor signal representative of measured physiologic activity from at least one sensor unit;
    at least one sensor unit adapted to measure physiologic activity and to generate analog measurement signals in response thereof, the sensor unit being connected to said DC power wire, and having means for processing and sending a sensor signal representative of measured physiologic activity by a wire to said communication module;
    a processing unit adapted to form from said analog measurement signals data messages assigned to successive predetermined transmission time slots of a wireless communication protocol;
    a wireless communication unit for transmitting in said time slots said data messages in a temporal order using said wireless communication protocol; and
    a wireless receiver device adapted to receive said data messages at successive time slots.

2. The arrangement according to claim 1, wherein the communication module includes said processing unit and said wireless communication unit and said sensor unit includes said processing unit.

3. The arrangement according to claim 1, wherein the at least one sensor unit is adapted to send a sensor signal representative of measured physiologic activity to said communication module by applying said sensor signal on said DC power wire or on a dedicated signal wire.

4. The arrangement according to claim 3, wherein the at least one sensor unit is adapted to add a digital sensor unit identification code to said measurement signal representative of measured physiologic activity on said wire.

5. The arrangement according to claim 1, wherein the processing unit is further adapted to:
    execute a sensor signal analysis algorithm specific to the type of sensor unit and/or the physiologic activity being measured, so as to determine first time points based on a predefined characteristics of the sensor signals;
    determine second time points corresponding to the timing of said predetermined transmission time slots according to said wireless communication protocol for the transfer of data messages to said wireless communication unit;
    pair a first and a second time point for each data message to be sent to said wireless communication unit; and
    add information on the difference between said first and second time points to said data messages.

6. A communication module for monitoring physical performance, including:
    means for providing DC power by wire to at least one sensor unit;
    means for receiving at least one sensor signal representative of measured physiologic activity from at least one sensor unit by a wire;
    means for allocating measurement data signals into data messages in successive predetermined transmission time slots of a wireless communication protocol; and
    a wireless communication unit for transmitting in said successive time slots said data messages in a temporal order to a wireless receiver device using said wireless communication protocol.

7. The communication module according to claim 6, including a processing unit being adapted to:
    receive analog measurement signals sent from a sensor unit on said wire;
    identify said analog measurement signals based on a digital sensor unit identification code added to said measurement signal on the wire;
    process said measurement signals into data messages allocated to predetermined transmission time slots; and
    transmit said data messages to a wireless receiver device at successive time slots using said wireless communication protocol.

8. The communication module according to claim 7, wherein the processing unit is further adapted to detect said digital sensor unit identification code by using a lookup algorithm coded in a memory unit of said processing unit, and to combine data derived from said measurement signals with data relating to the identified digital code into said data messages to be sent by said wireless communication unit to said wireless receiver device at predetermined and successive time slots according to said wireless communication protocol.

9. The communication module according to claim 7, wherein:
said communication module includes means for mounting the module to a mounting zone on a sports item, the means for mounting comprising two electronic contact terminals for making an electronic contact with the sports item while being mounted thereon, said processing unit being functionally connected to said contact terminals and to said wireless communication unit and capable of processing data received through the contact terminals and/or the wireless communication unit according to data processing instructions, wherein
the communication module including means for receiving sensor signals from at least one sensor unit located in the sports item and for detecting a digital sensor unit identification code in order to identify the sports item while being mounted thereon, and
the processing unit being capable of changing said data processing instructions based on the value of the identifier read from the sports item.

10. The communication module according to claim 6, wherein the means for receiving a sensor signal representative of measured physiologic activity is using said DC power wire or a dedicated wire as a signaling channel.

11. The communication module according to claim 6, wherein the means for receiving the sensor signals and the processing unit are adapted to receive and process electromyographic (EMG) signals from at least one EMG electrode.

12. The communication module according to claim 6, wherein the communication module includes a memory unit for storing an identifier of the communication module and is adapted to include said identifier in said data messages to said wireless receiver device.

13. The communication module according to claim 6, wherein the module is capable of receiving data messages from another communication module and to interleave received data messages received therefrom with its own data messages according to said wireless communication protocol.

14. The communication module according to claim 6, wherein the communication module is capable of receiving data messages from a similar communication module and to interleave and relay said received data messages with its own data messages by allocating the data messages in said predetermined transmission time slots for transmission to a wireless receiver device, and to include in the relayed data an identifier of the other similar communication module and information on the time of receipt of the data to be relayed.

15. A sensor unit for monitoring physical performance comprising:

a connection to a communication module;
an input for a DC power wire from the communication module;
means for measuring physiologic activity and to generate analog measurement signals in response thereof;
means for providing a sensor unit identification;
means for processing and combining said measurement signals with said sensor unit identification into an output signal to be sent to the communication module on a wire; and
means for sending said output signal representative of the measured physiologic activity to said communication module.

16. The sensor unit according to claim 15, wherein the sensor unit includes a processing unit further adapted to:
execute a sensor signal analysis algorithm specific to the type of sensor unit and/or the physiologic activity being measured so as to determine first time points based on predefined characteristics of the sensor signals;
determine second time points corresponding to the timing of said predetermined transmission time slots according to a communication protocol for the transfer of data messages to said wireless communication unit;
pair a first and a second time point for each data message to be sent to said wireless communication unit; and
add information on the difference between said first and second time points to said data messages to be sent to said communication module.

17. The sensor unit according to claim 16, wherein:
said sensor unit includes means for mounting the unit to a mounting zone on a sports item, the means for mounting comprising two electronic contact terminals for making an electronic contact with the sports item while being mounted thereon, said processing unit being functionally connected to said contact terminals and to said communication module and capable of processing data received through the contact terminals according to data processing instructions, wherein
the sensor unit including means for receiving an identification code located in the sports item in order to identify the sports item while being mounted thereon, and
the processing unit being capable of changing said data processing instructions based on the value of the identifier read from the sports item.

18. The sensor unit according to claim 15, wherein the sensor unit identification is provided by adding a digital code unique to each sensor unit to said measurement signal or a communication protocol allocating predetermined time slots in which the output signals are sent to said communication module.

19. The sensor unit according to claim 15, wherein the means for sending said output signal representative of measured physiologic activity is provided by using said DC power wire or a dedicated wire as a signaling channel.

20. The sensor unit according to claim 15, wherein the sensor unit signals is adapted to measure and process electromyographic (EMG) signals from at least one EMG electrode.

* * * * *